United States Patent
Hrusch

(10) Patent No.: US 11,320,030 B2
(45) Date of Patent: May 3, 2022

(54) TWO SPEED TRANSMISSION FOR ROTARY DRIVE SYSTEM

(71) Applicant: Schaeffler Technologies AG & Co. KG, Herzogenaurach (DE)

(72) Inventor: Nicholas Hrusch, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/093,758

(22) Filed: Nov. 10, 2020

(65) Prior Publication Data

US 2021/0156458 A1    May 27, 2021

Related U.S. Application Data

(60) Provisional application No. 62/945,119, filed on Dec. 7, 2019, provisional application No. 62/939,100, filed on Nov. 22, 2019.

(51) Int. Cl.
| | | |
|---|---|---|
| *F16H 37/06* | (2006.01) | |
| *F16H 3/54* | (2006.01) | |
| *F02B 67/06* | (2006.01) | |

(52) U.S. Cl.
CPC ......... *F16H 37/065* (2013.01); *F02B 67/06* (2013.01); *F16H 3/54* (2013.01); *F16H 2200/0034* (2013.01); *F16H 2200/2005* (2013.01); *F16H 2200/2033* (2013.01)

(58) Field of Classification Search
CPC ............ F16H 3/54; F16H 2200/2005; F16H 2200/0034; F16H 2200/2033; F16H 37/065; F02B 67/06
See application file for complete search history.

(56) References Cited

U.S. PATENT DOCUMENTS 5,842,944 A * 12/1998 Morishita ............... F02B 67/06
                                                        475/154
10,830,126 B2    11/2020  Hrusch et al.
(Continued)

FOREIGN PATENT DOCUMENTS

DE    2801812 A1 *  7/1979  ........... B60H 1/3222
FR    2624943 A1 *  6/1989  ............... F16H 3/54
(Continued)

OTHER PUBLICATIONS

Translation of FR2624943, retrieved on Aug. 24, 2021 (Year: 2021).*

(Continued)

*Primary Examiner* — Stacey A Fluhart

(57) ABSTRACT

A two-speed transmission alternately establishes two speed ratios between a primary drive pulley and one or more accessories pulleys of an accessory drive system. The two-speed transmission includes concentric input and output shafts fixed to input and output pulleys respectively. When an actuator is disengaged, a one-way clutch transfers power between the input shaft and the output shaft. The input shaft is fixed to the planet carrier of a planetary gear set and the output shaft is fixed to the sun gear of the planetary gear set. When the actuator is engaged, the ring gear of the planetary gear set is held establishing an overdrive speed relationship between the input pulley and the output pulley.

9 Claims, 2 Drawing Sheets

(56) References Cited

U.S. PATENT DOCUMENTS

| | | | |
|---|---|---|---|
| 2003/0104900 A1* | 6/2003 | Takahashi | B60W 20/30 477/3 |
| 2005/0153813 A1 | 7/2005 | Serkh | |
| 2008/0179119 A1* | 7/2008 | Grenn | B60W 20/10 477/5 |
| 2019/0301573 A1 | 10/2019 | Hrusch et al. | |
| 2021/0048091 A1 | 2/2021 | Hrusch et al. | |

FOREIGN PATENT DOCUMENTS

| | | | | |
|---|---|---|---|---|
| FR | 2627132 A1 * | 8/1989 | | F02B 67/06 |
| GB | 2455097 A * | 6/2009 | | F16H 3/54 |
| WO | WO-2012075985 A1 * | 6/2012 | | F16H 55/36 |

OTHER PUBLICATIONS

"Short Cuts for Analyzing Planetary Gearing" by Ferguson, May 26, 1983 (Year: 1983).*
U.S. Appl. No. 16/683,973, filed Nov. 14, 2019 (unpublished, copy enclosed).

* cited by examiner

TWO SPEED TRANSMISSION FOR ROTARY DRIVE SYSTEM

CROSS-REFERENCE TO RELATED APPLICATIONS

This application claims priority to U.S. Provisional Application 62/939,100 filed Nov. 22, 2019 and U.S. Provisional Application 62/945,119 filed Dec. 7, 2019, the entire disclosures of which are incorporated by reference herein.

TECHNICAL FIELD

This disclosure is generally related to a two-speed transmission that can be applied to a rotary drive system, including, but not limited to, an accessory drive system for an internal combustion (IC) engine or vehicle.

BACKGROUND

Some rotary drive systems are limited in driven shaft speed control due to a coupling, many times via an endless drive band such as a belt, between a driven shaft and a prime mover such as a crankshaft of an IC engine. A given driven shaft rotary speed is a function of the prime mover rotational speed and a pulley ratio between the prime mover and the driven shaft. Additional speed control could be beneficial for applications that require a higher output or higher shaft speed at lower (such as idle) prime mover speeds.

SUMMARY

A two-speed transmission for a rotary drive system includes input and output shafts, a one-way clutch, a planetary gear drive, and an electromagnetic brake. The input shaft fixed to an input pulley. The output shaft fixed to an output pulley. The one-way clutch is arranged between the input and output shafts. The planetary gear drive includes a sun gear, carrier, ring gear, and planet gears. The carrier is fixed to the input shaft. The planet gears are supported for rotation with respect to the carrier. The ring gear is engaged with the plurality of planet gears. The sun gear is fixed to the output shaft and is engaged with the plurality of planet gears. The electromagnetic brake is configured to selectively ground the ring gear. The input pulley may be axially arranged between the planetary gear drive and the output pulley. The planetary gear drive may be arranged between the input pulley and the electromagnetic brake. A support bracket may be adapted for fixation to an internal combustion engine. A central support shaft may be fixed to the support bracket. A first ball bearing may be arranged between the central support shaft and the sun gear. A needle roller bearing may be arranged between the central support shaft and the output shaft. A ring gear carrier and a cover plate may be fixed to the ring gear. A second ball bearing and a first dynamic seal may be arranged between the ring gear carrier and the sun gear. A third ball bearing and a second dynamic seal may be arranged between the cover plate and the input shaft. A third dynamic seal may be arranged between the input shaft and the output shaft.

A first accessory drive includes the two-speed transmission. A primary belt is wound around a primary drive pulley, a first accessory drive pulley, and the input pulley. A secondary belt is wound around the output pulley and a second accessory pulley. The second accessory drive pulley may be fixed to a reversible electric machine.

A second accessory drive includes the two-speed transmission. A primary belt is wound around a primary drive pulley and the input pulley. A secondary belt is wound around the output pulley, a first accessory pulley, and a second accessory pulley. The second accessory drive pulley may be fixed to a reversible electric machine.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
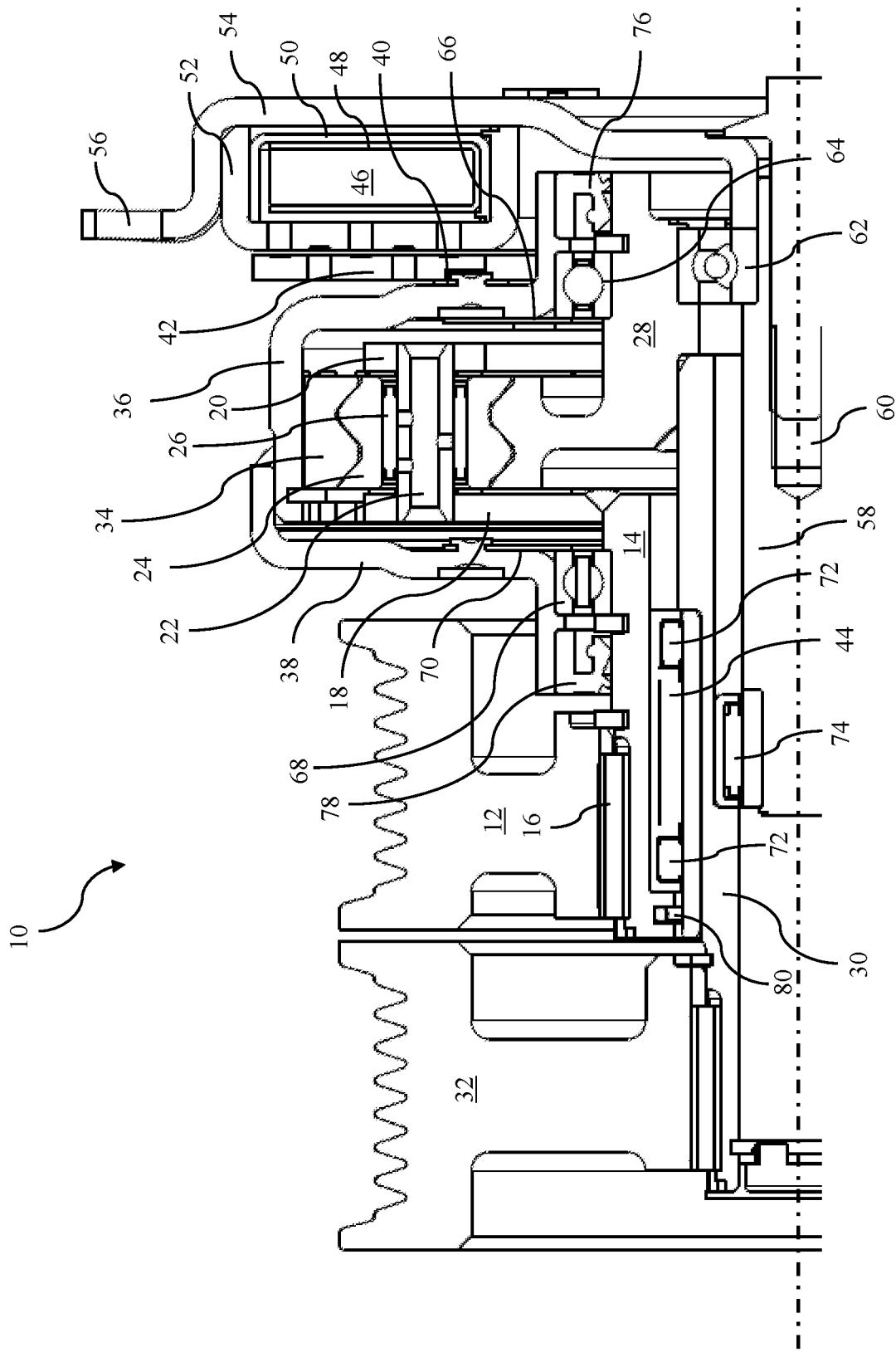
FIG. 1 is a cross section of a two-speed transmission.

FIG. 1 is a cross-sectional view of a two-speed transmission 10 that can be applied to a rotary drive system. Since the transmission is mostly axi-symetric, only half of the cross section is illustrated. Input power is delivered to the two-speed transmission 10 through an input pulley 12. The input pulley 12 is attached to an input shaft 14 through a spring pin 16, press-fit, and staked connection. Other suitable connection means are also possible. The input shaft 14 is attached, possibly via a weld or other suitable attachment means, to a first planet carrier plate 18. The first planet carrier plate 18 is attached, possibly via a weld or other suitable means, to a second planet carrier plate 20 to form a rigid structure that drives planet pins 22 and their corresponding planet gears 24 through pinion bearings 26. A sun gear 28 is attached, possibly via a weld or other suitable attachment means, to an output shaft 30. This output shaft 30 is connected to an output pulley 32 through the same kind of connection as the input pulley 12. A ring gear 34 is splined to a ring gear carrier 36 and retained with a snap ring. This ring gear carrier 36 is attached, possibly via a weld or other suitable attachment means, to a cover plate 38 that seals the fluid in the assembly while also providing centering and support between ring gear 34 and input shaft 14. The ring gear carrier 36 is also riveted to leaf springs 40 connected to a coil armature plate 42. The leaf springs 40 springably attach the ring gear carrier 36 to the coil armature plate 42. In a first speed mode 51, which can be referred to as "normal operation", the input shaft 14 and output shaft 30 are locked together through one-way clutch 44. This bypasses the gearset and delivers power directly from the input pulley 12 to the output pulley 32 with no change in speed or torque. Note that, in the first speed mode 51, power transfer is only possible in one direction. If power were to be applied at the output pulley 32, one-way clutch 44 would overrun and not transfer the power to input pulley 12.

When a second speed mode S2, also termed as an "overdrive mode", is desired, the ring gear 34 can be grounded with the use of an electromagnetic coil 46. This coil 46 is wound around a bobbin 48 and staked into place within a stamped coil carrier plate 50 which forms part of the magnetic circuit. The coil 46 and carrier plate 50 are installed into a coil core plate 52 and together are staked in place into a support bracket 54. When energized, the coil 46 produces a magnetic circuit that pulls on the coil armature plate 42. When the coil armature plate 42 contacts the coil core plate 52, the ring gear 34 is brought to zero speed through the friction torque between the parts. When the coil 46 is de-energized, the leaf springs 40 return the coil armature plate 42 to its original position, and the gearset returns to 1:1 mode. The support bracket 54 can be attached to ground in any way required but is shown here as having tabs 56 formed in the support bracket that act as flanges for a bolted or riveted connection. The support bracket 54 is clamped to a central support shaft 58 via a center bolt 60, which ties the bracket assembly back to the sun gear 14.

The system is supported by a number of bearings to carry belt loads and the thrust loads from the helical gearset and coil actuation force. A first ball bearing 62 arranged between the central support shaft 58 and sun gear 28 centers the gearbox back to the support bracket 54 and receives axial loads in both directions. A second ball bearing 64 arranged between the ring gear 34 and sun gear 28 centers the gears to one another and receives the opposing thrust loading from the helical gearset. The ball bearing 64 is depicted as being axially retained on one of its sides with a thin retainer plate 66 that is riveted to the ring gear 34. A third ball bearing 68 centers the ring gear 34 to the input shaft 14 and axially locates the planet carrier to the ring gear 34. The ball bearing 68 is depicted as being axially retained on one of its sides with a thin retainer plate 70 that is riveted to the cover plate 38. Two cylindrical bearings 72 form part of the one-way clutch 44 and center the inner and outer races to one another, while also helping transmit radial load from the belt tensions. A needle roller bearing 74 pressed into the output shaft 30 provides support for the assembly cantilevered from the support bracket 54 through central support shaft 58.

The two-speed transmission 10 is intended to be filled with lubed-for-life lubricant to reduce friction in the gearset, one-way clutch 44, and bearings. While in 1:1 mode, no relative motion should be occurring between any of the internal gearbox components, so cooling requirements are low. The ring gear 34 is static while in overdrive which provides natural means of oil recirculation within the gearbox, when lubricant flow is needed most. If additional forced flow is needed, an oil scoop plate or additional flow holes could be added. The planet pins 22 have cross drilled holes to allow oil through the planet pin 22 and pinion bearing 26 and could have a catcher scoop inserted if more oil needs to be pushed into the planet pin 22. To seal the two-speed transmission 10, dynamic seals 76, 78, and 80 are located, respectively, at the back of the assembly between the ring gear 34 and sun gear 28, between the input shaft 14 and cover plate 38, and between the input shaft 14 and output shaft 30. Any kind of dynamic seals may be used, but they are shown in the Figures as being either lip seals or o-ring backed PTFE square seals.

Figure 2:
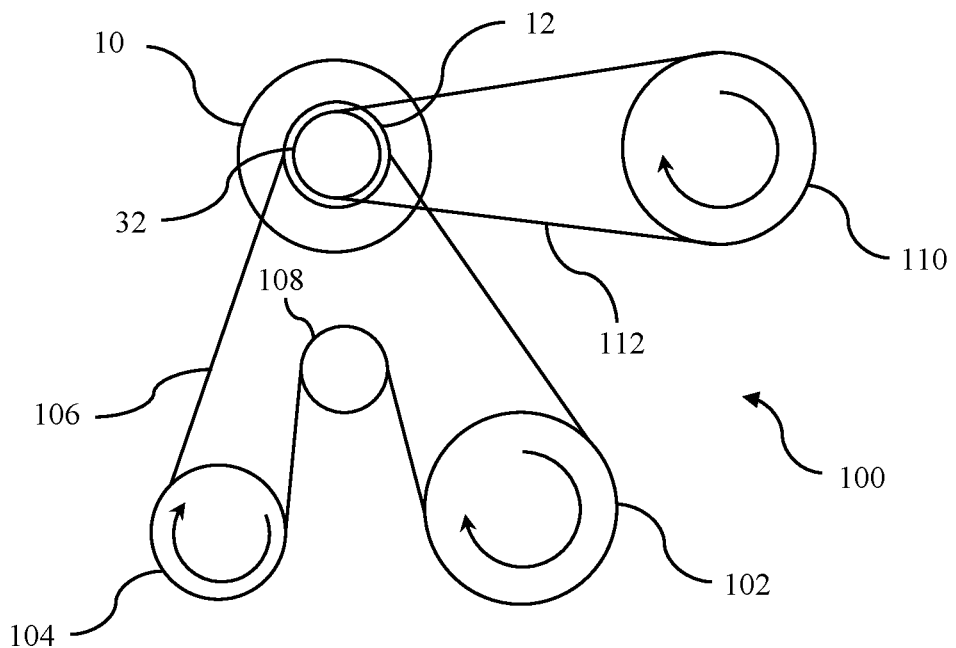
FIG. 2 is a schematic of a first accessory drive system utilizing the two-speed transmission of FIG. 1.

On a system level, the two-speed transmission 10 of FIG. 1 could be used for a variety of accessory drive systems where an overdrive ratio needs to selectively be applied to one or more accessories. One exemplary accessory drive system 100 is illustrated in FIG. 2. A first pulley 102 is fixed to a primary drive such as an engine crankshaft. A second pulley 104 is fixed to a first accessory, such as an air conditioning compressor. A primary belt 106 winds around the first pulley 102, an idler pulley 108, the second pulley 104, and the input pulley 12 of the two-speed transmission 10. A third pulley 110 is fixed to a second accessory such as an alternator. A secondary belt 112 winds around the third pulley and the output pulley 32 of the two-speed transmission 10. With the electro-magnetic brake disengaged, the primary drive provides power to both the first and second accessories at speed ratios determined by the relative diameters of the various pulleys. The pulley sizes are selected such that the second accessory is driven at a required speed when the primary drive is rotating faster than a threshold speed. When the speed of the primary drive is less than the threshold speed, the electro-magnetic brake is engaged such that the second accessory is driven with an increased speed ratio. This arrangement provides several advantages relative to a single speed drive. The second accessory may be reduced in size while still satisfying its requirements when the engine is at low speed such as idle. The pulley diameters may be selected such that the second accessory is not subjected to as high of a speed when the engine is operated at the engine's maximum speed.

Additional functionality is available when the second accessory is a reversible electric machine such as a Belt Starter/Generator (BSG). With the electro-magnetic brake engaged, power can be transferred from the BSG to the first accessory and to the crankshaft to either re-start the engine or to supplement the engine's power output. When the BSG is providing power, the planetary gear set of two-speed transmission 10 provides torque multiplication.

Figure 3:
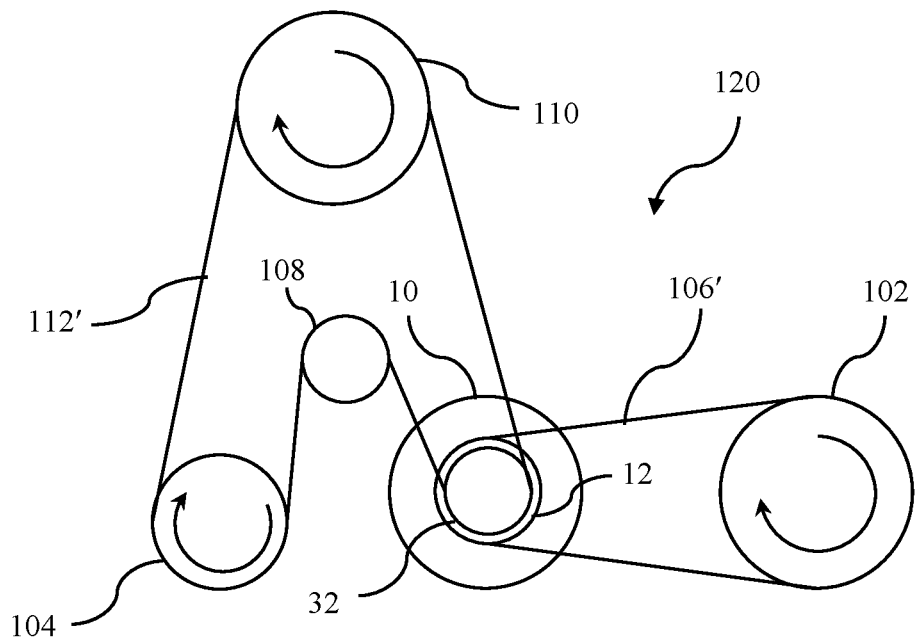
FIG. 3 is a schematic of a second accessory drive system utilizing the two-speed transmission of FIG. 1.

A second exemplary accessory drive system 120 is illustrated in FIG. 3. Primary belt 106' wraps around primary drive pulley 102 and input pulley 12 of the two-speed transmission 10. Secondary belt 112' wraps around output pulley 32 of two-speed transmission 10, idler pulley 108, second pulley 104, and third pulley 110. As in the system of FIG. 2, second pulley 104 is fixed to a first accessory such as an air conditioning compressor and third pulley 110 is fixed to a second accessory such as an alternator or a BSG. When the electro-magnetic brake is engaged, both the first and the second accessories are driven faster relative to the primary drive. In this system, if one of the accessories is a BSG, then, while the magnetic brake is disengaged, the BSG can provide power to the other accessory even while the primary drive is stationary. When the electro-magnetic brake is engaged, the BSG can re-start the engine.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. An accessory drive comprising:
   a two-speed transmission having:
      an input shaft fixed to an input pulley;
      an output shaft fixed to an output pulley;
      a one-way clutch arranged to constrain a speed of the input shaft to be no greater than a speed of the output shaft;
      a planetary gear drive including:
         a carrier fixed to the input shaft;
         a plurality of planet gears supported for rotation with respect to the carrier;
         a ring gear engaged with the plurality of planet gears; and
         a sun gear fixed to the output shaft and engaged with the plurality of planet gears; and,
      an electromagnetic brake configured to selectively ground the ring gear; and
   a primary drive pulley;
   a first accessory pulley;
   a second accessory pulley;
   a primary belt wound around the primary drive pulley, the first accessory pulley, and the input pulley; and
   a second belt wound around the output pulley and the second accessory pulley.

2. The two-speed transmission of claim 1, wherein the input pulley is axially arranged between the planetary gear drive and the output pulley.

3. The two-speed transmission of claim 2, wherein the planetary gear drive is arranged between the input pulley and the electromagnetic brake.

4. The accessory drive of claim 1 wherein the second accessory pulley is fixed to a reversible electric machine.

5. A two-speed transmission for a rotary drive system, the two-speed transmission comprising:
   an input shaft fixed to an input pulley;
   an output shaft fixed to an output pulley;
   a one-way clutch arranged between the input and output shafts;
   a planetary gear drive including:
      a carrier fixed to the input shaft,
      a plurality of planet gears supported for rotation with respect to the carrier,
      a ring gear engaged with the plurality of planet gears, and
      a sun gear fixed to the output shaft and engaged with the plurality of planet gears, and,
   an electromagnetic brake configured to selectively ground the ring gear;
   a support bracket adapted for fixation to an internal combustion engine;
   a central support shaft fixed to the support bracket;
   a first ball bearing arranged between the central support shaft and the sun gear; and
   a needle roller bearing arranged between the central support shaft and the output shaft.

6. A two-speed transmission for a rotary drive system, the two-speed transmission comprising:
   an input shaft fixed to an input pulley;
   an output shaft fixed to an output pulley;
   a one-way clutch arranged to constrain a speed of the input shaft to be no greater than a speed of the output shaft;
   a planetary gear drive including:
      a carrier fixed to the input shaft;
      a plurality of planet gears supported for rotation with respect to the carrier;
      a ring gear engaged with the plurality of planet gears; and
      a sun gear fixed to the output shaft and engaged with the plurality of planet gears;
   an electromagnetic brake configured to selectively around the ring gear;
   a ring gear carrier fixed to the ring gear;
   a first ball bearing arranged between the ring gear carrier and the sun gear;
   a cover plate fixed to the ring gear; and
   a second ball bearing arranged between the cover plate and the input shaft.

7. The two-speed transmission of claim 6, further comprising:
   a first dynamic seal arranged between the ring gear carrier and the sun gear;
   a second dynamic seal arranged between the cover plate and the input shaft; and
   a third dynamic seal arranged between the input shaft and the output shaft.

8. An accessory drive comprising:
   a two-speed transmission according to claim 6;
   a primary drive pulley;
   a first accessory pulley;
   a second accessory pulley;
   a primary belt wound around the primary drive pulley and the input pulley; and
   a secondary belt wound around the output pulley, the first accessory pulley, and the second accessory pulley.

9. The accessory drive of claim 8 wherein the second accessory pulley is fixed to a reversible electric machine.

* * * * *